United States Patent [19]

Häfner

[11] Patent Number: 4,848,478

[45] Date of Patent: Jul. 18, 1989

[54] METHOD AND APPARATUS FOR CALIBRATING AND/OR CHECKING OF LOAD CELLS

[75] Inventor: Hans W. Häfner, Aichach, Fed. Rep. of Germany

[73] Assignee: Pfister GmbH, Fed. Rep. of Germany

[21] Appl. No.: 135,019

[22] Filed: Dec. 7, 1987

[51] Int. Cl.⁴ .................... G01G 19/52; G01L 25/00
[52] U.S. Cl. ........................................ 177/50; 73/1 B
[58] Field of Search ............................ 177/50; 73/1 B

[56] References Cited

U.S. PATENT DOCUMENTS 4,213,509 7/1980 Hafner ................................. 177/199
4,658,921 4/1987 Karpa .................................... 177/50

Primary Examiner—George H. Miller, Jr.
Attorney, Agent, or Firm—Lowe, Price, Leblanc, Becker & Shur

[57] ABSTRACT

A method and an apparatus for calibrating and/or testing of load cells of heavy duty weighing systems use a force transmission device being self-adjustable without friction and having a force transmission ratio in the range of 1:50 to 1:5000 and is adapted to be placed onto a force introduction member. The load cell interposed between said force introduction member and a base may be calibrated by connecting said force transmission device through said force introduction member to said base and by applying varying calibration standards at the force introduction side of the force transmission device.

18 Claims, 1 Drawing Sheet

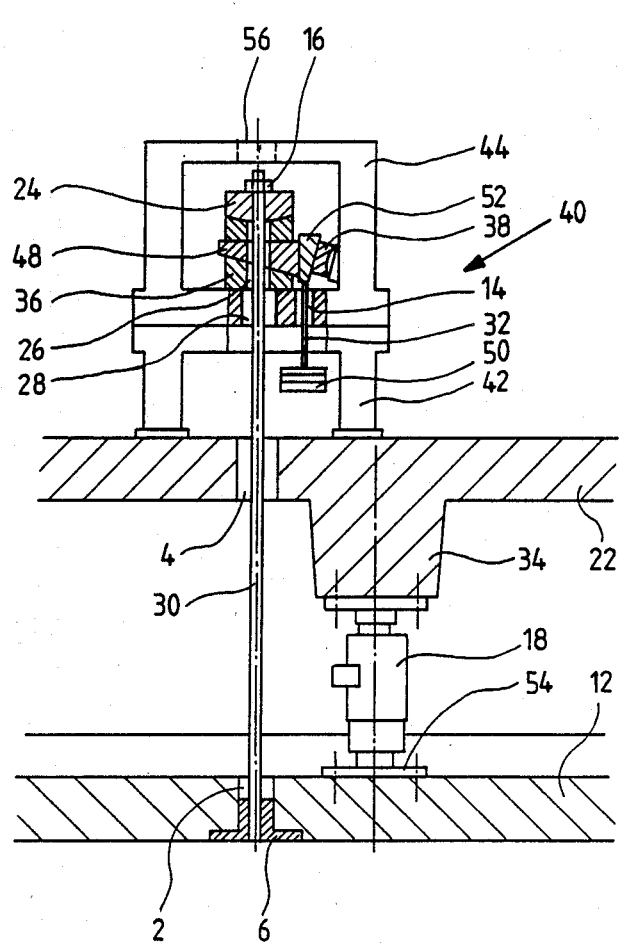

METHOD AND APPARATUS FOR CALIBRATING AND/OR CHECKING OF LOAD CELLS

FIELD OF THE INVENTION

The invention relates to a method and an apparatus for calibrating and/or checking of load cells incorporated in vehicle weighing systems, bunkers or similar heavy load devices.

BACKGROUND ART

Vehicle weighing systems, bunker or bin weighing systems or similar heavy load weighing devices generally use load cells in a measuring range of, for example 0.1 to 10 MN. After installation of the load cells into the systems they are calibrated and periodically checked for proper function. Up to now, it was necessary to load these weighing systems with very large calibrating or test masses of widely varying sizes. For example, a truck was put onto the platform of a vehicle weighing system to be calibrated, the truck having an exactly defined mass. Then, the truck was removed from the platform and loaded with a pre-determined calibration mass and put onto the platform again. This procedure was performed repeatedly, as many as twenty times with the truck being loaded with different calibration masses or standards each time.

Furthermore, it has been proposed to use for calibrating or testing heaving load weighing systems a calibrating or testing device provided with an exactly calibrated load cell. In view of the inherent creepage in the engaging connection between the weighing system and the calibrating or testing device the force applied to the weighing system does not remain constant. Thus, the accuracy of the calibrating or testing is rather low.

SUMMARY OF THE INVENTION

It is an object of the invention to provide a method for calibrating and/or testing of load cells incorporated in heavy load weighing systems with a very high accuracy.

it is a further object of the invention to provide an apparatus for calibrating and/or testing of load cells incorporated in heavy load weighing systems, the apparatus having a very simple design and being easy transportable.

It is a further object of the invention to provide an apparatus for calibrating and/or testing load cells incorporated in heavy load weighing systems, the apparatus having a very high accuracy.

It is a still further object of the present invention to provide a method for calibrating and/or testing of load cells incorporated in heavy load weighing systems, the method being easy to apply, fast and accurate.

These and other objects of the invention are achieved by an apparatus for calibrating and/or testing of load cells interposed between a base and a force introduction member of heavy duty weighing systems, comprising: a force transmission device having a transmission device with a transmission ratio in the range of about 50 to 5000, being self-adjustable without friction and adapted to be placed against said force introduction member; and a connecting means for connecting said force transmission device to said base at a position close to said load cell and arranged in a direction of a force applied by said force transmission device to said load cell.

According to another aspect of the invention there is provided a method for calibrating and/or testing of load cells interposed between a base and a force introduction member of a heavy duty weighing system comprising the steps of (a) placing a force transmission device, which is self-adjustable without friction against said force introduction member; (b) connecting said force transmission device through an opening of said force introduction member to said base; (c) loading said force transmission device with a calibrating standard in the range of 50 to 5000 times smaller than the standard loading of said weighing systems; (d) determining the reading of said load cell; and (e) repeating steps (c) and (d) with different calibrating standards for determining a calibration or testing curve corresponding to said load cell.

BRIEF DESCRIPTION OF THE DRAWING

The single FIGURE in the drawing is an elevational view, partly in section, of the calibrating and/or testing apparatus of the invention as applied to a vehicle weighing system.

BEST MODE OF CARRYING OUT THE INVENTION

The drawing illustrates part of a vehicle weighing system comprising a base 12 and a platform 22 having a load cell 18 provided therebetween. The load cell 18 rests on the base 12 and the load, e.g., a truck or a similar vehicle placed on the platform 22 is transmitted to into the load cell 18 from the platform 28 via a girder 34 provided on the bottom side of the platform 22.

It will be appreciated that the weighing system must be calibrated after incorporating the load cell 18 into the system. Then, according to the prior art, very large masses are required to calibrate the load cell 18.

Instead, according to the invention there is used a force transmission device generally indicated by the reference numeral 40 which is inherently self-adjustable without friction and which allows, due to a high ratio of force transmission and the frictionless transmission of force application, to use very small calibrating standards.

The principle of design and operation of the force transmission apparatus 40 have been disclosed in detail in U.S. Pat. No. 4,213,509, in particular at FIG. 3 and the associated description. This, however, was in quite a different environment, i.e., for testing load cells as such that were put into the apparatus.

In view of the detailed disclosure in U.S. Pat. No. 4,213,509, a description of the force transmission apparatus 40 used in connection with the invention is restricted to the basic design. Thus, the apparatus 40 comprises a frame 42 adapted to be firmly placed on the platform 24, supporting a housing 44 containing the force transmission elements, in particular wedges 48 and 52 which are guided in hydrostatic or pneumostatic bearings as explained in detail in the above mentioned reference. Specifically, wedge 42 is frictionlessly guided for movement in an essentially horizontal direction in a support member 36 firmly supporting on frame 42.

On the other hand, wedge 52 is arranged for movement in the vertical direction between one of the end surfaces of wedge 48 and a support element 38 resting on an inner side surface of the housing 44.

It should be noted that the top surface of support element 36 has a spherical shape and has engaged thereto, again by interposing a hydrostatic bearing, a fixing member 24 having a bottom surface formed to be complementary to the top surface of support element 36.

It should be noted that there is provided an essentially vertical through hole 26 in the support element 36 and, aligned thereto, a passage 28 in the frame 42 for loosely passing a connecting member 30, preferably a rod made of metal. The upper end of the connecting member 30 passes through the fixing member 24 as well, and is provided with a threading for having screwed thereon a nut 16.

As may seen from the drawing the connecting member 30 passes a passage 4 provided in the platform 22 and has its lower end provided with a threading to be screwed into a holding member 6 fixed at the base 12. It should be noted that this threading may be provided in a bore in the base 12, thus eliminating the holding member 6. Furthermore, the upper end of the connecting member 30 may fixed to fixing member 24 in any other known way rather than by the nut 16.

In order to calibrate or test the load cell 18 the wedge 52 is loaded by an exactly defined calibration mass or standard 50 in a vertical direction. This calibration mass 50 may be connected to the lower end of wedge 52 by a cord or wire 32 passed through a passage 14 in the frame 42, or such calibration mass 50 may be put onto the upper horizontal end surface of the wedge 52 or a table appropriately attached to this upper surface.

Although two wedges 42 and 52 are shown in the drawing for transmitting a low force caused by the calibration mass 50 into a very high force applied to the load cell 18, it should be appreciated that the transmission apparatus 40 may use only one wedge 48 with the cord 32 directly connected to the left end surface (as seen in the drawing) the cord being deflected to the horizontal direction by means of a roll (not shown) or a similar known means.

Calibrating or testing of the load cell 18 is accomplished according to the method of the invention as follows.

First, the apparatus 40 is placed onto the platform 22 in essential alignment with through hole 26, the passages 28 and 4 and the holding member 6. The connecting member 30 is then introduced through an opening 56 in the top wall of the housing 44 and is passed through the throughhole 26, the passages 28 and 4 in order to engage the threading of the holding member 6.

As a next step, the connecting member 30 is threaded into the holding member 6, with the nut 16 fixed to the upper end of the connecting member 30. The result is a firm exactly defined transmission chain from the calibrating mass 50, via wedges 52, 48, the upper part of the support element 36 to the fixing member 24 the connecting member 30 the holding member 6 to the base 12 and the lower end of the load cell 18.

On the other hand, the reaction force is transmitted through the lower part of support element 36, the frame 42 and the platform 22 to the upper end of the load cell 18. Thus, a very high force corresponding to the calibration mass 50 attached to court 32, but transmitted in a very high ratio, for example in the range of 1:100 to 1:5000 due to the transmission ratios of the two wedges 42 and 42, is applied between the upper and lower ends of the load cell 18.

As explained in detail in U.S. Pat. No. 4,213,509, due to the guidance of the wedges 48 and 52 in hydrostatic bearings there is essentially no friction at all and the apparatus is self-adjusting; thus, it is the exactly defined force caused by the calibration mass 50 which is applied to the load cell 18.

The load cell 18 will generate an electrical signal corresponding to the applied force. By varying the calibration mass 50, various readings are derived from the load cell 18 which may be used for plotting the usual calibration curve. Alternatively, the various values of the calibration masses and the corresponding readings of the load cell 18 may be entered into an electronic evaluation device for compensating for any deviations of the load cell 18 in any future weighing procedures.

It should be noted that due to the spherical hydrostatic bearing between the top surface of the support element 36 and the fixing member 24 any deviation from the exact vertical direction of the connecting member 30 is readily accommodated.

In the forgoing description; a method and an apparatus for calibrating and/or testing of load cells have been disclosed that are incorporated into heavy load weighing systems. Through use of a transmission device having a high transmission ratio and being self-adjustable without any friction, it is possible to calibrate and/or test such load cells using very small calibration masses. Also, the transmission apparatus is a compact device which makes it as easily transportable as the calibration masses.

I claim:

1. An apparatus for calibrating and or testing individually one or more load cells interposed between a base provided with an aperture close to each load cell and a force introduction member of a heavy duty weighing system, comprising:
   a force transmission device having a central aperture and adapted to be placed against said force introduction member; and
   a single connecting member for connecting said force transmission device to said base through a corresponding one of said apertures therein at a position close to a selected one of said load cells and arranged in a direction of a force applied by said force transmission device to said load cell, said single connecting member being disposed in use through said central aperture of said force transmission device aligned with apertures provided for accomodation of the connecting member in said force introduction member and said base.

2. The apparatus of claim 1, wherein: said force transmission device comprises a wedge-type transmission means guided without friction in hydrostatic bearings.

3. The apparatus of claim 2, wherein:
   said wedge-type transmission means comprises a first wedge and a second wedge, said first wedge having an axis of movement extending horizontally and said second wedge having an axis of movement extending vertically, and a calibration mass attachable to said second wedge for applying a force thereto in the vertical direction, the first wedge having an aperture for accommodating said connecting member therethrough.

4. The apparatus of claim 2, wherein:
   said wedge-type means comprises a wedge having an axis of movement extending horizontally and a central aperture for accommodating said connecting member therethrough, a calibration mass being applicable thereto by a flexible means for pulling said wedge in said horizontal direction.

5. The apparatus of claim 1, wherein: said force transmission device includes a frame adapted to be firmly placed in relation to said force introduction member of said weighing system and firmly supporting a support member for guiding a wedge-type transmission means for movement in a horizontal direction.

6. The apparatus of claim 1, wherein: said connecting member has a longitudinal extension such that it extends from said force transmission device to said base and is provided at a lower end thereof with means for fixing said connecting member to said base.

7. The apparatus of claim 6; wherein: said lower end of said connecting member is provided with a threading adapted to be screwed into a threading means provided in said base.

8. The apparatus of claim 7, wherein: said threading means is a sleeve fixedly inserted into said base and having an inner threading for engagement with said connecting member.

9. The apparatus of claim 1, wherein: said connecting member has a longitudinal extension such that a lower end thereof may be fixed at said base and an upper end thereof may be fixed at an upper fixing member supported by hydrostatic bearings on wedge-type force transmission means.

10. The apparatus of claim 9, wherein: said wedge-type force transmission means includes a support element for horizontally guiding a wedge means in hydrostatic bearings, said support member having a top surface in engagement with a bottom surface of said fixing member via a hydrostatic bearing.

11. The apparatus of claim 10, wherein: said top surface of said support member and said bottom surface of said fixing member have complementary spherical shapes.

12. The apparatus of claim 1, wherein: said force transmission means is covered by a housing provided with an opening for inserting said connecting member.

13. A method for calibrating and/or testing of load cells interposed between a base and a force introduction member of a heavy duty weighing system, both of which have alignable apertures formed therein comprising the steps of:
 (a) placing a force transmission device with a central aperture against said force introduction member in alignment with said apertures of said force introduction member and said base;
 (b) connecting said force transmission device, through said apertures with said base;
 (c) loading said force transmission device with a calibrating standard;
 (d) determining the reading of said load sell; and
 (e) repeating steps c) and d) with different calibrating standards, for thereby determining a calibration/testing curve applicable to said load cell.

14. The method of claim 13, wherein:
said force transmission device is a wedge type transmission means with a force transmission ratio in the range of 1:50 to 1:5000, and wherein said step c) comprises the step of attaching said calibration standard to said wedge-type force transmission device.

15. The method of claim 13, wherein:
said step (b) comprises the step of inserting a single connecting member having a longitudinal extension through said aligned apertures of said force transmission device and said force introduction member and fixing a lower end of said connecting member to said base at a correspondingly aligned one of the apertures provided therein.

16. The method of claim 15, wherein:
said force transmission device is placed on a frame and is surrounded by a housing and said step (b) includes the step of inserting said single connecting member through an opening of said housing and an opening in said frame to said center aperture of said transmission device.

17. The method of claim 13 wherein: said steps (a) to (e) are preceded by providing said base with a fixing means for a connecting member and providing said force introduction member with an opening essentially aligned in vertical direction with said fixing means.

18. A heavy duty weighing system, comprising:
a plurality of load cells interposed between a base means and a force introduction member;
a single connecting member;
a plurality of fixing means, one being provided at said base means close to each load cell for fixing of said connecting member thereat; and
a passage in said force introduction member vertically alignable with each of said fixing means for passing therethrough of said connecting member to be fixed at said base by said fixing means, the system being adapted to be connected to a calibrating and/or testing apparatus for said load cells.

* * * * *